United States Patent
Singh et al.

(10) Patent No.: US 11,349,111 B2
(45) Date of Patent: *May 31, 2022

(54) ARTIFICIAL SEI TRANSPLANTATION FOR INSERTION ANODES

(71) Applicant: Toyota Motor Engineering & Manufacturing North America, Inc., Plano, TX (US)

(72) Inventors: Nikhilendra Singh, Ypsilanti, MI (US); Timothy S. Arthur, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/527,870

(22) Filed: Jul. 31, 2019

(65) Prior Publication Data

US 2019/0355963 A1 Nov. 21, 2019

Related U.S. Application Data

(63) Continuation-in-part of application No. 15/606,803, filed on May 26, 2017, now Pat. No. 10,505,219.

(51) Int. Cl.
*H01M 4/04* (2006.01)
*H01M 4/36* (2006.01)
(Continued)

(52) U.S. Cl.
CPC ......... *H01M 4/0447* (2013.01); *H01M 4/366* (2013.01); *H01M 4/628* (2013.01); *H01M 10/0525* (2013.01)

(58) Field of Classification Search
CPC . H01M 4/0447; H01M 4/366; H01M 10/0525
See application file for complete search history.

(56) References Cited

U.S. PATENT DOCUMENTS

| | | | |
|---|---|---|---|
| 6,053,953 | A | 4/2000 | Tomiyama et al. |
| 6,344,293 | B1 | 2/2002 | Geronov |

(Continued)

OTHER PUBLICATIONS

Robert Kerr, Nikhilendra Singh, Timothy S. Arthur, Thushan Pathirana, Fuminori Mizuno, Kensuke Takechi, Maria Forsyth, and Patrick C. Howlett, "Water-tolerant lithium metal cycling in high lithium concentration phosphonium-based ionic liquid electrolytes", Sustainable Energy Fuels, 2018, 2, 2276-2283. (Year: 2018).*

(Continued)

*Primary Examiner* — Jonathan G Jelsma
(74) *Attorney, Agent, or Firm* — Christopher G. Darrow; Darrow Mustafa PC

(57) ABSTRACT

An insertion anode for a Li-ion cell, protected with an SEI by pre-treatment in an SEI-formation cell, is stable for cell cycling even in the presence of substantial water in the cell electrolyte. A method for making the protected anode includes forming an SEI on a lithium-ion insertion electrode by performing multiple charge/discharge cycles on the electrode in a first cell having an SEI formation electrolyte to produce the protected anode. The SEI formation electrolyte includes an ionic liquid having at least one of twelve organic cations.

20 Claims, 6 Drawing Sheets

(51) Int. Cl.
*H01M 10/0525* (2010.01)
*H01M 4/62* (2006.01)

(56) References Cited

U.S. PATENT DOCUMENTS

| | | |
|---|---|---|
| 9,276,292 B1 | 3/2016 | MacKenzie et al. |
| 2002/0036884 A1 | 3/2002 | Shimamoto et al. |
| 2005/0136247 A1 | 6/2005 | Sumiya et al. |
| 2007/0042271 A1 | 2/2007 | Nishida et al. |
| 2008/0094777 A1 | 4/2008 | Nishida |
| 2013/0345380 A1 | 12/2013 | Schmidt et al. |
| 2014/0125292 A1 | 5/2014 | Best et al. |
| 2014/0212772 A1 | 7/2014 | Nakamoto et al. |
| 2016/0126582 A1 | 5/2016 | Xiao et al. |
| 2018/0062206 A1 | 3/2018 | Fang et al. |
| 2018/0151916 A1 | 5/2018 | Howlett et al. |
| 2019/0252689 A1* | 8/2019 | Xu .................. H01M 4/8878 |

OTHER PUBLICATIONS

Lane, G. et al., "Ionic Liquid Electrolyte for Lithium Metal Batteries: Physical, Electrochemical, and Interfacial Studies of N-Methyl-N-butylmorpholinium Bis(fluorosulfonyl)imide," J. Phys. Chem. C 2010, 114, 49, pp. 21775-21785.

Girard, G.M.A. et al., "Electrochemical and physicochemical properties of small phosphonium cation ionic liquid alectrolytes with high lithium salt content," Phys. Chem. Chem. Phys., 2015, 17, pp. 8706-8713.

Pozo-Gonzalo, C. et al., "Redox Chemistry of the Superoxide Ion in a Phosphonium-Based Ionic Liquid in the Presence of Water," J. Phys. Chem. Lett., 2013, 4, pp. 1834-1837.

Pozo-Gonzalo, C. et al., "Insights into the reversible oxygen reduction reaction in a series of phosphonium-based ionic liquids," Phys. Chem. Chem. Phys., 2014, 16, pp. 25062-25070.

Pozo-Gonzalo, C. et al., "Enhanced performance of phosphonium based ionic liquids towards 4 electronix osygen reduction reaction upon addition of a weak proton source," Electrochemistry Communications, 38 (2014) pp. 24-27.

Mizuno, F. et al., "Water in Ionic Liquid for Electrochemical Li Cycling," ACS Energy Lett., 1, (2016) pp. 542-547.

Misback, Bob, "Large Format Li4Ti5O12 Lithium-Ion Batteries Performance and Applications," Altairnano.com (2010) http://www.aertc.org/conference2010/speakers/AEC%202010%20Session%204/4F%20ESO%20Bat.%20Chem.%20&%20Mat.%20I/Robert%20Misback/Large%20Format%20Li4Ti5O12%20Lithium-Ion%20BatteriesSECURED.pdf (last accessed Jul. 9, 2019).

* cited by examiner

ARTIFICIAL SEI TRANSPLANTATION FOR INSERTION ANODES

CROSS-REFERENCE TO RELATED APPLICATIONS

This application is a continuation-in-part of U.S. patent application Ser. No. 15/606,803, which was filed May 26, 2017, and which is herein incorporated by reference in its entirety.

TECHNICAL FIELD

The present disclosure generally relates to electrodes for rechargeable batteries and, more particularly, to electrodes having preformed solid-electrolyte interphases.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Water tends to degrade lithium-ion insertion anodes, presenting a difficulty for aqueous lithium battery technology utilizing such anodes. In addition, it is known that common organic electrolytes for lithium-ion batteries do not function well in the presence of water. In particular, any water in these electrolyte results in cell failure.

Batteries are commonly known to form solid-electrolyte interphases (SEIs) at the contact points of solid electrodes and liquid electrolytes. These SEIs are often a combination of electrode and electrolyte components, sometimes including decomposition products of said electrolytes. SEIs at times will passivate an electrode, diminishing conductivity. However, at other times, SEIs will also provide a protective layer, stabilizing the electrode against corrosion or other undesired side reactions. No SEI is currently known that enables a lithium-ion insertion anode to undergo stable cycling in the presence of water in the electrolyte.

Accordingly, it would be desirable to provide an improved method for protecting a lithium-ion insertion anode against water in electrolyte.

SUMMARY

This section provides a general summary of the disclosure, and is not a comprehensive disclosure of its full scope or all of its features.

In various aspects, the present teachings provide a method for preparing a lithium-ion cell having a protected anode with a pre-formed solid electrolyte interphase (SEI). The method includes a step of forming an SEI on a lithium-ion insertion electrode by performing multiple charge/discharge cycles on the electrode in a first cell having an SEI formation electrolyte to produce the protected anode. The SEI formation electrolyte includes a lithium salt selected from the group consisting of lithium bis(fluorosulfonyl)imide (LiFSI), lithium bis(trifluoromethanesulfonyl)imide (LiTFSI), and lithium dicyanamide (LiDCA). The SEI formation electrolyte further includes an ionic liquid having a cation selected from the group: 1-methyl-1-propylpyrrolidinium; N-methyl-N,N-diethyl-N-propylammonium; N,N-diethyl-N-methyl-N-(2-methoxyethyl)-ammonium; 1,1-ethylpropylpiperidinium; N-methyl-N-(2-methoxyethyl)-pyrrolidinium; trimethylisopropylphosphonium; methyltriethylphosphonium; methyltributylphosphonium; N,N-dimethyl-N-(2-methoxyethyl)-N-ethyl-ammonium; 1-methyl-1-butylpyrrolidinium; N-methyl-N'-ethylimidazolium); N,N,N-trimethyl-N-propylammonium; and mixtures thereof. The ionic liquid also includes an anion selected from the group consisting of FSI, TFSI, and DCA. The method further includes a step of assembling a wet Li-ion voltaic cell. The wet Li-ion cell includes the protected anode; and a wet electrolyte in contact with the protected anode. The wet electrolyte includes at least 10000 ppm water.

In further aspects, the present teachings provide a method for preparing a lithium-ion cell having a protected anode with a pre-formed solid electrolyte interphase (SEI). The method includes a step of forming an SEI on a lithium-ion insertion electrode by performing multiple charge/discharge cycles on the electrode in a first cell having an SEI formation electrolyte to produce the protected anode. The SEI formation electrolyte includes lithium bis(fluorosulfonyl)imide (LiFSI) and an ionic liquid. The ionic liquid includes a cation selected from the group: 1-methyl-1-propylpyrrolidinium; N-methyl-N,N-diethyl-N-propylammonium; N,N-diethyl-N-methyl-N-(2-methoxyethyl)-ammonium; 1,1-ethylpropylpiperidinium; N-methyl-N-(2-methoxyethyl)-pyrrolidinium; trimethylisopropylphosphonium; methyltriethylphosphonium; methyltributylphosphonium; N,N-dimethyl-N-(2-methoxyethyl)-N-ethyl-ammonium; 1-methyl-1-butylpyrrolidinium; N-methyl-N'-ethylimidazolium); N,N,N-trimethyl-N-propylammonium; and mixtures thereof. The ionic liquid also includes an FSAI anion. The method further includes a step of assembling a wet Li-ion voltaic cell. The wet Li-ion cell includes the protected anode; and a wet electrolyte in contact with the protected anode. The wet electrolyte includes at least 10000 ppm water.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide methods for forming a solid electrolyte interphase (SEI) on an insertion anode of a Li-ion cell, and for transplanting the insertion anode with the formed SEI to a second Li-ion cell. The insertion anode so transplanted can be electrochemically stable when contacting an electrolyte having water in excess of 10000 ppm.

The method for forming the SEI includes cycling the insertion anode against an electrolyte that includes a lithium salt having a lithium cation and a first anion selected from the group consisting of bis(fluorosulfonyl)imide (FSI), bis(trifluoromethanesulfonyl)imide (TFSI), and dicyanamide (DCA). The electrolyte further includes an ionic liquid having any of the three aforementioned anions, and at least one of twelve disclosed organic cations. As shown in the results below, this protects the anode when it is transplanted into the second Li-ion cell having a water-containing electrolyte.

Figure 1:
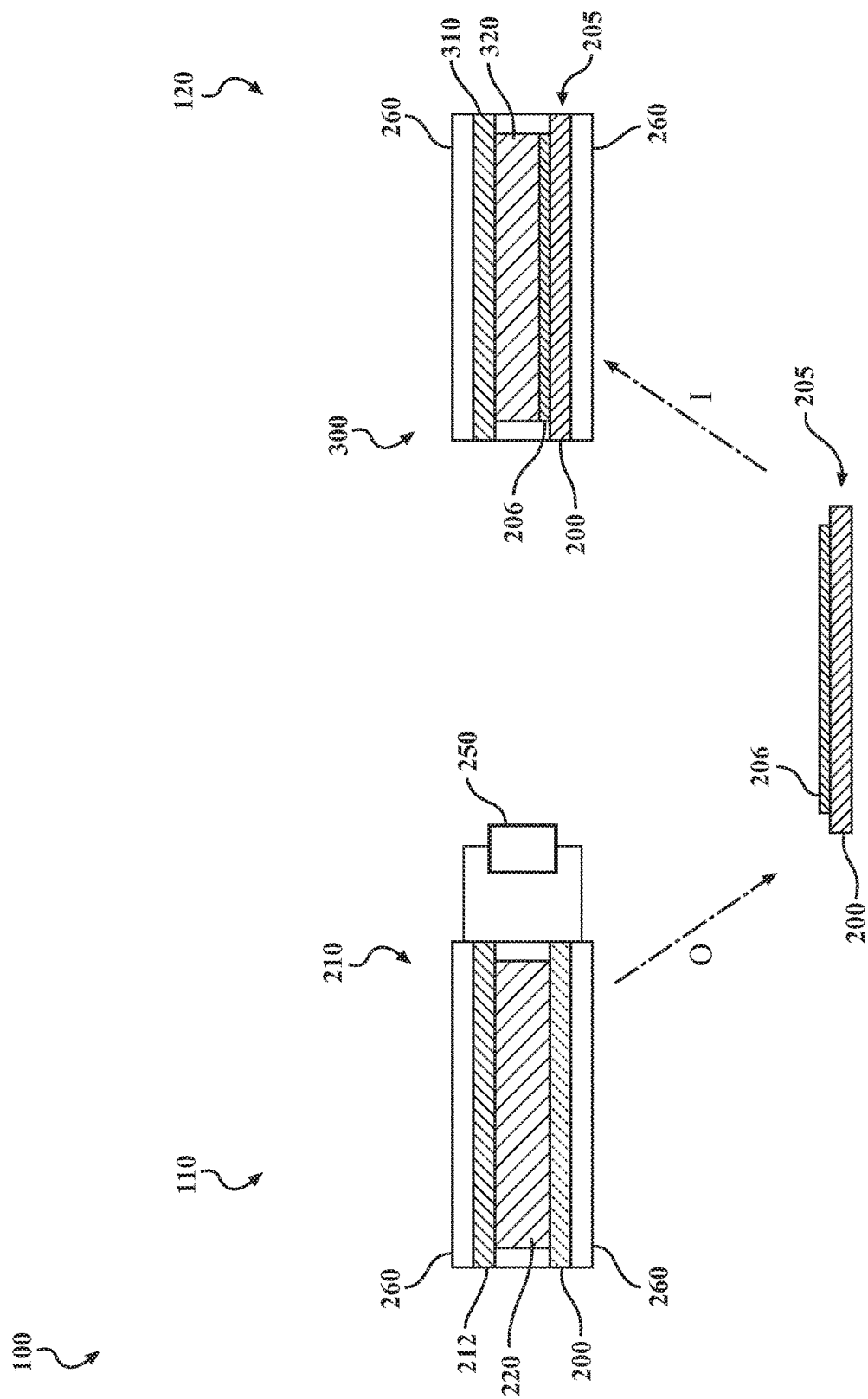
FIG. 1 is a schematic illustration of a method for preparing a Li-ion cell, and also includes schematic illustrations of a first cell used to prepare a protected lithium-ion insertion anode, and a wet Li-ion cell that includes the protected lithium-ion insertion anode.
Figure 2A:
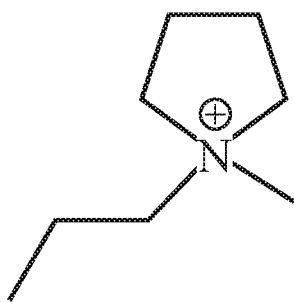
FIGS. 2A-2L are line drawings of organic cations suitable for use in an SEI formation electrolyte that is used in the first cell of FIG. 1.
Figure 2B:
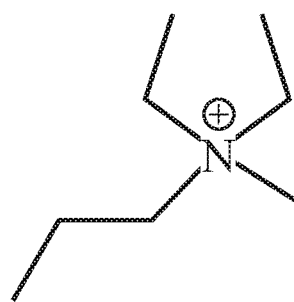
Figure 2C:
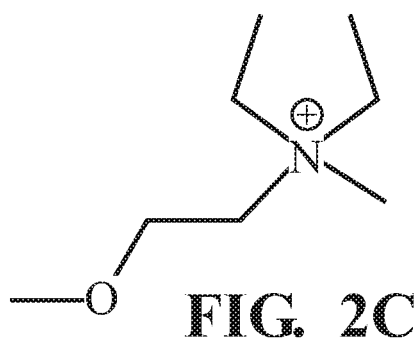
Figure 2D:
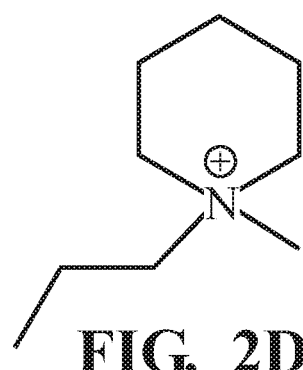
Figure 2E:
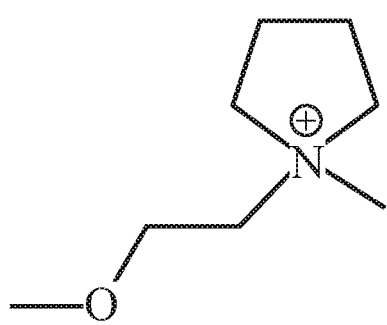
Figure 2F:
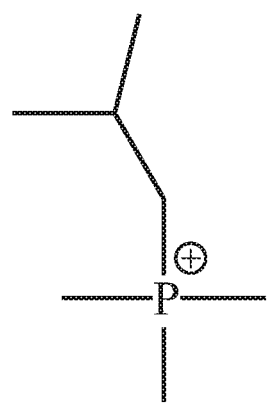
Figure 2G:
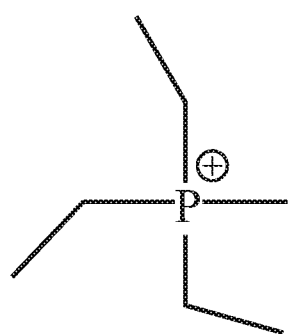
Figure 2H:
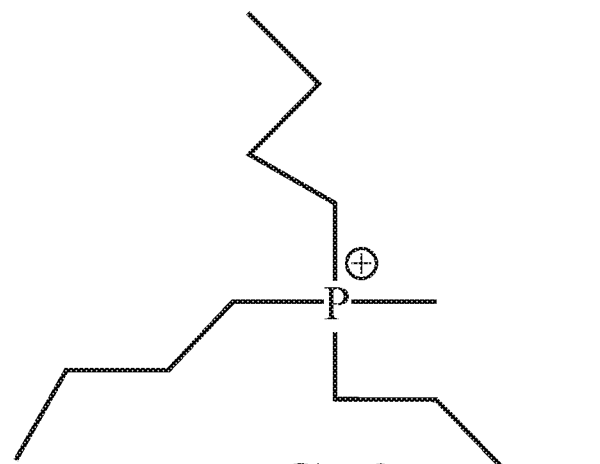
Figure 2I:
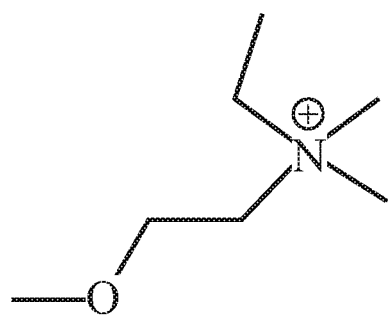
Figure 2J:
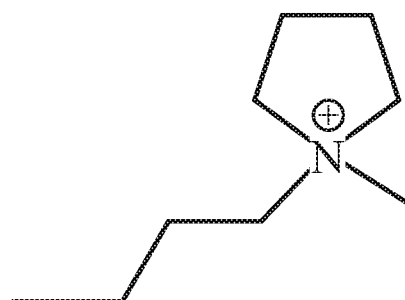
Figure 2K:
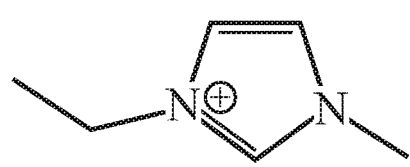
Figure 2L:
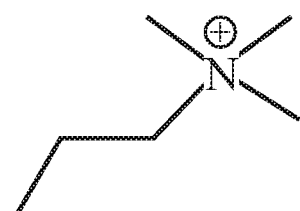

FIG. 1 provides a schematic illustration of a disclosed method 100 for making a Li-ion voltaic cell with a water-containing electrolyte. The method 100 includes a step 110 of forming an SEI by performing multiple charge/discharge cycles on at least one lithium-ion insertion electrode 200 in a first cell 210 having an SEI formation electrolyte 220. The SEI formation electrolyte 220 includes a lithium salt having a lithium cation and a first anion selected from the group consisting of bis(fluorosulfonyl)imide (FSI), bis(trifluoromethanesulfonyl)imide (TFSI), and dicyanamide (DCA). The electrolyte further includes an ionic liquid having a second anion selected from the group consisting of FSI, TFSI, and DCA. The ionic liquid further includes an organic cation. FIGS. 2A-2L show line drawings of various organic cations that can be present in the ionic liquid, including: 1-methyl-1-propylpyrrolidinium (referred to hereinafter as "Pyr13"; FIG. 2A); N-methyl-N,N-diethyl-N-propylammonium (N1223, FIG. 2B); N,N-diethyl-N-methyl-N-(2-methoxyethyl)-ammonium (DEME, FIG. 2C); 1,1-methylpropylpiperidinium (referred to hereinafter as "Pip13", FIG. 2D); N-methyl-N-(2-methoxyethyl)-pyrrolidinium (Pyr12$_O$1, (FIG. 2E); trimethylisopropylphosphonium (P111$_i$4, FIG. 2F); methyltriethylphosphonium (P1222, FIG. 2G); methyltributylphosphonium (P1444, FIG. 2H); N,N-dimethyl-N-(2-methoxyethyl)-N-ethyl-ammonium (DMME, FIG. 2I); 1-methyl-1-butylpyrrolidinium (Pyr14, FIG. 2J); N-methyl-N'-ethylimidazolium (IM12, FIG. 2K); N,N,N-trimethyl-N-propylammonium (N1113, FIG. 2L); and mixtures thereof. In many implementations, the first and second anions will be the same.

In some implementations, the SEI formation electrolyte will include the lithium salt present at a molar ratio, relative to ionic liquid of: at least 1:5; or at least 1:2, or at least 1:1.

In some implementations, the SEI formation electrolyte 220 will include the lithium salt present at its saturation point in the ionic liquid (i.e. the SEI formation electrolyte 220 is a saturated solution of LiFSI in the ionic liquid). In some implementations, the SEI forming step 110 can be performed by cycling the first cell 210 at 1 mAh·cm$^{-2}$ for at least 10 cycles.

In some implementations, the SEI formation electrolyte 220 can be dry. As used in this context, the term "dry" means having water content of less than 50 ppm. Water content values in all cases discussed herein can be measured by the Karl Fischer titration.

It will be noted that the exemplary first cell 210 of FIG. 1 is an asymmetrical cell having a lithium-ion insertion electrode 200 opposite a non-identical electrode 212, such as a lithium metal electrode. In this scenario, the first cell 210 is operated as a voltaic cell that is alternatingly charged and discharged. In some implementations, however, the step 110 of forming an SEI can be performed in a symmetric cell having two lithium-ion insertion electrodes 200 of identical composition, that are alternatingly lithiated and delithiated by reversible application of an external power source.

The lithium-ion insertion electrode 200 can generally be any insertion electrode suitable for use as the negative electrode in a Li-ion voltaic cell. It will be understood that the terms "anode" and "negative electrode", as used herein, refers to an electrode at which electrochemical oxidation occurs during discharge of a Li-ion voltaic cell and at which electrochemical reduction occurs during charging of a Li-ion voltaic cell. Similarly, the term "cathode", as used herein, refers to an electrode at which electrochemical oxidation occurs during discharge of a Li-ion voltaic cell and at which electrochemical reduction occurs during charging of a Li-ion voltaic cell.

In certain broad implementations, the term "insertion anode" refers to any suitable anode material for a Li-ion battery, exclusive of lithium metal. In certain implementations, this can include pure intercalation anodes, in which lithium-ion insertion anodes are formally reduced and intercalated during incorporation, such as in graphite or other carbon-based anodes. In certain implementations, this can include conversion-type anodes, in which lithium cations remain formally oxidized during incorporation, and are incorporated into a nanolayered active material which is itself reduced. Examples of such anodic materials can include various transition metal oxides, sulfides, phosphides, and other chalcogenides, such as lithium titanate (LTO) or lithium vanadate (LVO). In some implementations, this can also include alloying anodes, in which lithium cation is reduced during incorporation and homogeneously alloyed with a metallic anodic material, such as in tin and silicon anodes.

As shown in FIG. 1, the protected lithium-ion insertion anode 205 includes the lithium-ion insertion anode 200 with an SEI 206 that is formed during the forming an SEI step 110. As discussed below, the SEI 206 provides good Li-ion conductivity and also stabilizes the protected lithium-ion insertion anode 205 in the presence of water, enabling the protected lithium-ion insertion anode 205 to be used with a "wet" electrolyte.

The method 100 can also a step 120 of assembling a wet lithium-ion cell 300 or a wet lithium-ion half-cell. A wet lithium-ion cell 300, as formed during the assembling 120 step, can include the protected lithium-ion insertion anode 205 opposite a cathode 310. The cathode 310 can be of any suitable cathode material. The wet Li-ion voltaic cell 300 further includes a wet electrolyte 320, in contact with the SEI 206 of the protected lithium-ion insertion anode 205, and generally providing direct or indirect ionic communication between the protected lithium-ion insertion anode 205 and the cathode 310. It will be appreciated that in certain test implementations, the wet Li-ion voltaic cell 300 can be a symmetric cell, having no cathode 310, but having opposing protected lithium-ion insertion anodes 205 contacting the wet electrolyte 320 and connected to a reversible power supply 250. In implementations wherein a wet lithium-ion half-cell is formed during the assembling 120 step, the half-cell includes the wet electrolyte 320 in contact with the protected lithium ion insertion anode 205, but does not include the cathode 310.

The wet electrolyte 320 can generally be any electrolyte able to support lithium redox electrochemistry, and further including a significant proportion of water. Thus, in various implementations, the wet electrolyte can include water present at a concentration within a range of from about 10,000 ppm to about 50,000 ppm. In some such implementations, the wet electrolyte can include water present at a concentration of at least about 20,000 or 30,000 ppm.

The dotted line labeled "O" in FIG. 1 represents taking the protected lithium-ion insertion anode 205 out of the first cell 210 after completion of the forming an SEI step 110. Similarly, the dotted line labeled "I" represents putting the protected lithium-ion insertion anode 205 into the wet voltaic Li-ion cell 300. Current collectors 260 are shown generically, and need not be of the same composition or structure.

The method 100 can optionally include a step of washing the protected lithium-ion insertion anode 205, performed after the forming an SEI step 110 and before the assembly step 120. It will generally be desirable that such a wash step be performed with a solvent capable of at least partially solubilizing the SEI formation electrolyte 220. Suitable examples can include, but are not limited to, multi-dentate ethers (i.e. ether solvents having more than one ethereal oxygen), such as propylenecarbonate or dimethylcarbonate (DMC).

The method 100 can also include a step of operating the wet Li-ion voltaic cell 300. The operating step can be performed, for example, by connecting the wet Li-ion voltaic cell to a circuit and discharging, charging, or performing one or more charge/discharge cycles of the wet Li-ion voltaic cell 300.

Figure 3A:
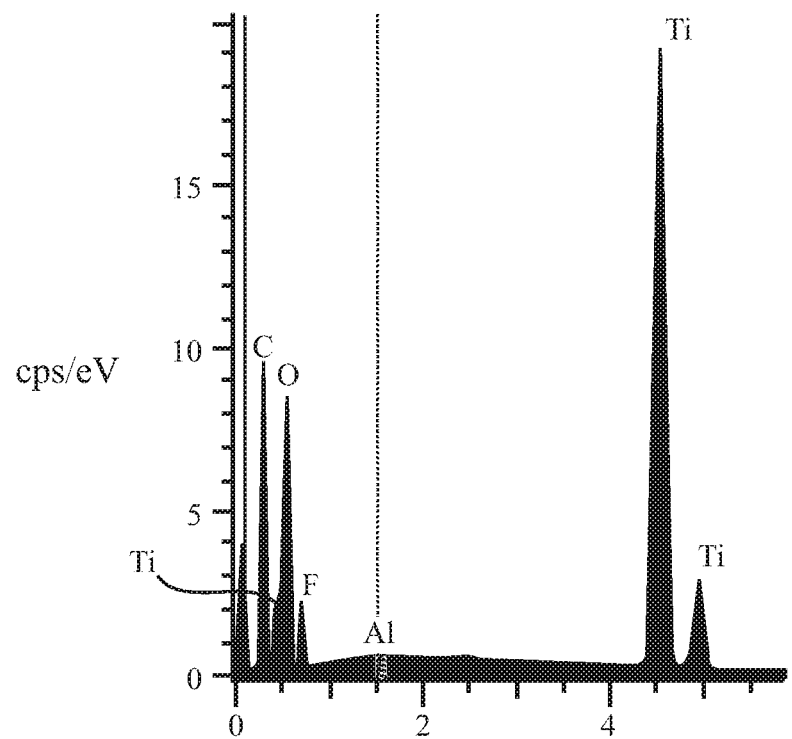
FIGS. 3A and 3B are plots of Energy Dispersive X-Ray Spectroscopy (EDS) data for an unprotected and protected lithium-ion insertion anode, respectively.
Figure 3B:
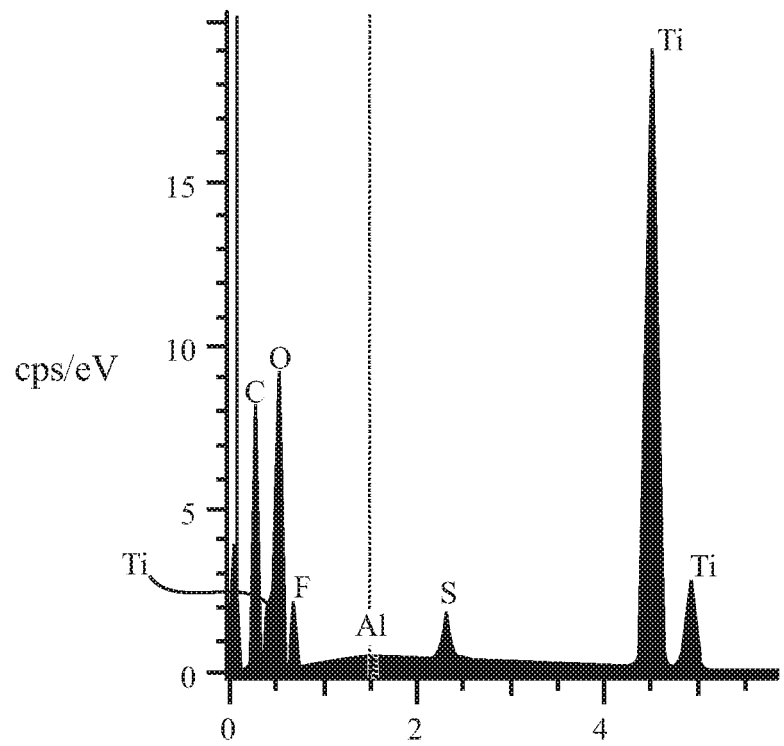

FIG. 3A shows Energy Dispersive X-Ray Spectroscopy (EDS) results for a pristine LTO electrode. FIG. 3B shows comparative EDS results for an LTO electrode that has been cycled according to the SEI formation step 110 of the method 100 as described above. The electrodes of FIGS. 3A and 3B are both washed in DMC solvent prior to EDS analysis, to remove any free SEI formation electrolyte 220 prior to the EDS analysis. It will be noted that only the cycled and washed electrode of FIG. 3B shows the presence of sulfur. It will further be understood that this result suggests formation of an SEI having sulfur derived from FSI anion present in the SEI formation electrolyte 220. Scanning electron microscopy results, coupled with EDS to generate a sulfur map of the electrode of FIG. 3B (not shown) indicate homogeneous sulfur distribution across the surface of the electrode that has been processed by the SEI formation step 110.

Table 1 shows sulfur and fluorine atomic % content, as determined by SEM-EDS for the electrodes of FIGS. 3A and 3B ("LTO pristine" and "LTO cycled"), respectively. Table 1 includes an additional comparative example ("LTO soaked") of an electrode that was placed in an SEI formation cell (i.e. first cell 210) identical to that in which the "LTO cycled" electrode was processed according the SEI formation step 110. The "LTO soaked" electrode was not cycled, however, and merely contacted, or soaked in, the SEI formation electrolyte 220 for twenty four (24) hours. The results provide clear evidence for higher sulfur content in the cycled sample than the soaked sample, eliminating the possibility of trapped ionic liquid generating all of the sulfur signals. Additionally, the fluorine content is also greater in the cycled LTO electrode. In certain implementations of the method 100, a surface of the protected lithium-ion insertion anode 205 (i.e. the SEI 206) can include at least 0.5 atomic % sulfur. In some implementations, a surface of the protected lithium ion insertion anode 205 can include at least 5 atomic % fluorine.

TABLE 1

| Element (Atomic %) | LTO Pristine (+PVDF) | LTO IL Soak | LTO Cycled |
|---|---|---|---|
| Sulfur | 0.0 | 0.3 | 0.7 |
| Fluorine | 3.4 | 5.6 | 7.0 |

Table 2 shows sulfur and fluorine atomic % content, as determined by SEM-EDS, for the "LTO pristine" and "LTO soaked" samples of Table 1, as well as for LTO electrodes processed according to the SEI formation step 110, but which were cycled potentiostatically at different lithiation voltages for LTO (1.0 V, 0.5 V and 0.1 V), while keeping the delithiation voltage constant at 2.0 V. As above, the electrodes are washed in DMC prior to EDS analysis.

TABLE 2

| LTO Condition | Sulfur (Atomic %) | Fluorine (Atomic %) |
|---|---|---|
| Pristine (+PVDF) | 0.0 | 3.4 |
| IL Soaked | 0.3 | 5.6 |
| 1 V Lithiation | 0.7 | 7.0 |
| 0.5 V Lithiation | 1.4 | 5.9 |
| 0.1 V Lithiation | 3.5 | 9.7 |

The results provide clear evidence for higher sulfur content in LTO samples cycled at 0.1 V and 0.5 V compared to 1.0 V. This suggests the formation of an interphase containing higher quantities of decomposition species from the ionic liquid. It will be understood that the greater quantity of SEI, as correlated to sulfur content, is expected to provide better protection against water in a water-containing electrolyte of a wet Li-ion voltaic cell 300.

Figure 4A:
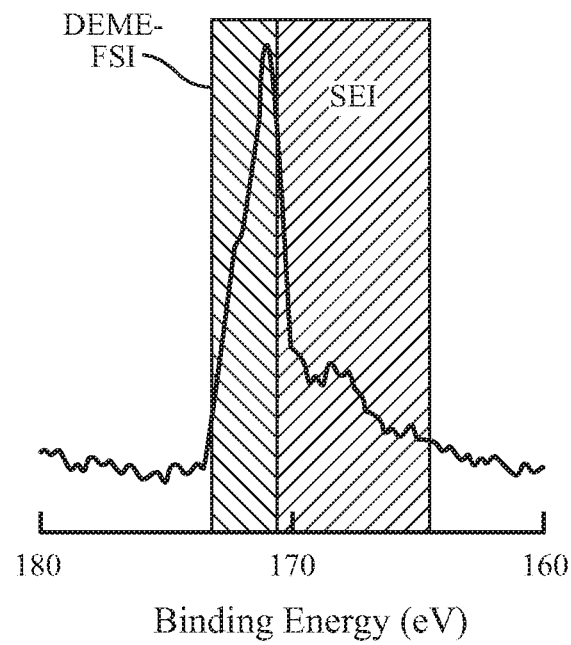
FIG. 4A is a plot of x-ray photoelectron spectroscopy (XPS) data for a protected lithium-ion insertion anode of the present teachings.
Figure 4B:
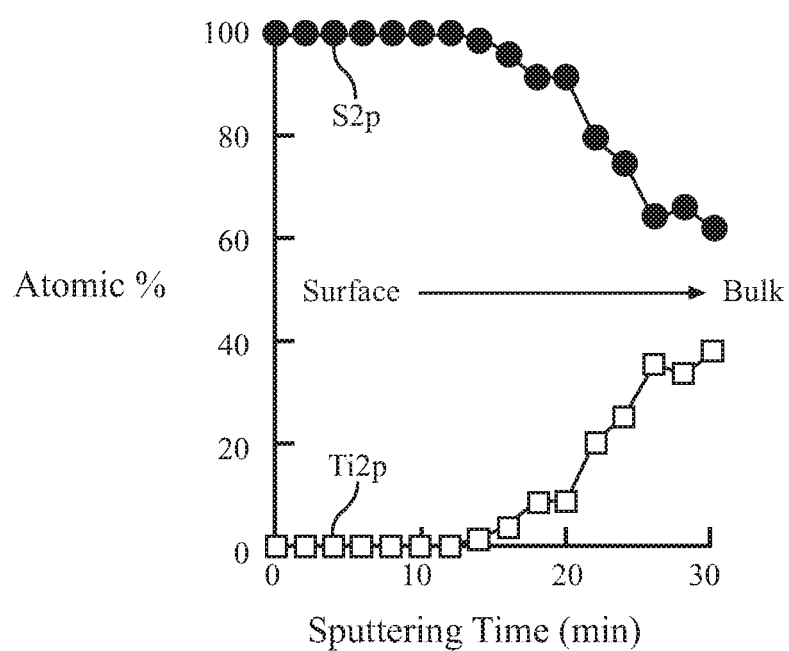
FIG. 4B is a plot of depth profiling date of S2p and Ti2p XPS peaks for the electrode of FIG. 4A.

FIG. 4A shows S2p (sulfur $2p$ orbital) x-ray photoelectron spectroscopy (XPS) data for the LTO electrode of Table 2 that has been cycled potentiostatically at 1.0 V lithiation voltage during the SEI formation step 110 and washed. The results of FIG. 4A show the presence of both adsorbed ionic liquid and SEI 206 at the surface of the electrode 200. FIG. 4B shows depth profiling of S2p and Ti2p XPS peaks for the electrode of FIG. 4A. The results show the SEI 206 is formed on the surface of LTO, and suggest that ionic liquid is adsorbed to the outer surface of the SEI 206.

Figure 5:
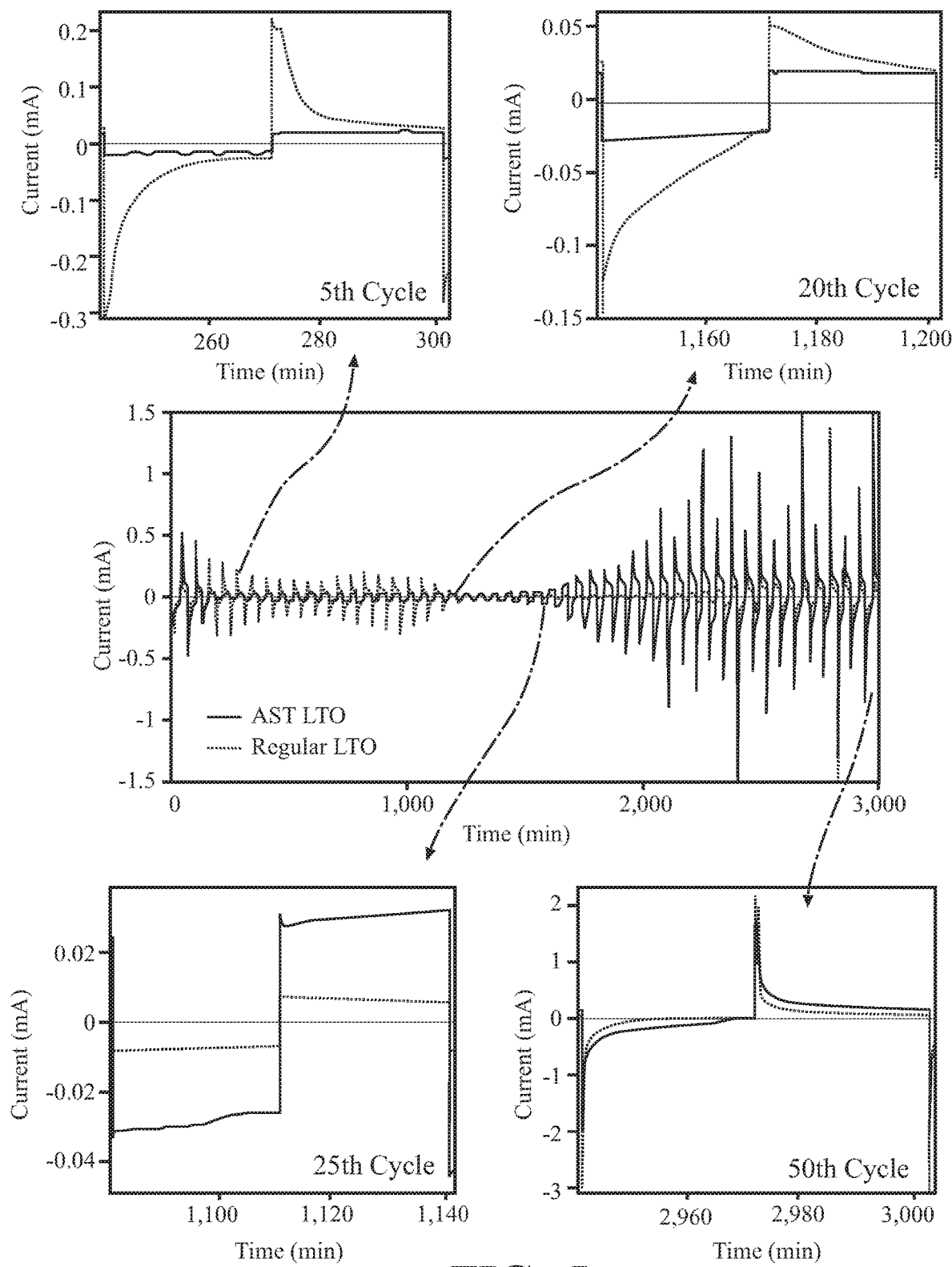
FIG. 5 is a plot of potentiostatic cycling data for a wet Li-ion voltaic cell having a protected lithium-ion insertion anode of the present teachings, and an otherwise equivalent wet Li-ion voltaic cell having an unprotected lithium-ion insertion anode.

FIG. 5 shows test data for a wet Li-ion voltaic cell 300 of the present teachings having a protected LTO anode, and an otherwise equivalent wet Li-ion voltaic cell having an unprotected LTO anode. Both cells of FIG. 5 have a protected lithium metal cathode that is made by a process analogous to the SEI formation step 110 of the present teachings, but in which the first cell includes at least one lithium metal electrode. The electrolyte in each cell is 1 vol.

% $H_2O$ LiTFSI/PC the cells are cycled potentiostatically at 1.0 V (lithiation) and 2.0 V (delithiation), for 30 min/half-cycle. It can be seen that, in the presence of $H_2O$, the wet Li-ion voltaic cell 300 having a protected insertion anode achieved a more favorable (lower current) cycling profile earlier (regions i and ii of FIG. 5) than the comparative cell having an unprotected insertion anode.

The results thus show that a protected insertion anode of the present teachings does improve lithiation and delithiation voltages in the presence of a water-containing electrolyte, as shown in FIG. 5. This suggests that the presence of the SEI layer 260 formed on the protected insertion anode during the SEI formation step 110 promoted Li ion transport through the interphase while protecting the anode from water in the electrolyte unlike regular LTO.

The present invention is further illustrated with respect to the following examples. It needs to be understood that these examples are provided to illustrate specific embodiments of the present invention and should not be construed as limiting the scope of the present invention.

Example 1. SEI Formation

A separator-free Tom-cell, having a standard PEEK spacer, is used to produce a stable SEI on LTO anode surfaces, and configured to enable easy cell opening for SEI formation electrolyte removal, and replace of the same with a water-containing conventional organic electrolyte such as 1M LiTFSI/PC. In a particular example, 15.6 mm diameter Li foil is set in the anode can of the separator-free Tom-cell and polished using a standard glass vial cap. The PEEK separator is then placed on top of this polished Li foil and pressed firmly by hand to ensure good adhesion to the Li foil. The spacer and anode are marked to ensure alignment so that, during disassembly, identical sample orientation is maintained so as not to introduce variations in cell parameters. The ionic liquid is added to the PEEK spacer well. A 15.6 mm diameter LTO on Ti foil is placed at the cathode side, and a stainless-steel disc placed on top of it to secure the LTO electrode in place. This disc is again marked for alignment with the marks made as described above. The cell is sealed and cycled potentiostatically at various lithiation and delithiation voltages for 10 cycles to develop the ionic liquid-based SEI. After the SEI formation is complete, the cell is dismantled and the ionic liquid and LTO/Li electrode surfaces are washed using DMC solvent.

Example 2. Assembly of Wet Li-Ion Cell

A wet electrolyte (1% vol. $H_2O$ 1M LiTFSI/PC) is added to the PEEK spacer well. The cell is resealed ensuring the same alignment of anode and cathode cans as indicated above. The cell is sealed and cycled potentiostatically at various lithiation and delithiation voltages for 100 cycles to test the cycling stability of the ionic liquid-based SEI in a water containing conventional organic electrolyte. Specific voltages and selection criteria are as described. All cell assembly/disassembly is carried out in an Ar-filled glove box. All Tom-cell components are sonicated in for 20 minutes in deionized water, followed by sonication in ethanol for 20 minutes. The cell components are then dried under vacuum at 80° C. overnight, prior to cell assembly. All electrochemical experiments were carried out on a Bio-Logic VMP3 Potentiostat at 25° C.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for preparing a lithium-ion cell having a protected insertion anode with a pre-formed solid electrolyte interphase (SEI), the method comprising:
    forming an SEI on at least one lithium-ion insertion electrode by performing cyclic lithiation/delithiation on the lithium-ion insertion electrode in a cell having an SEI formation electrolyte to produce the protected insertion anode, the SEI formation electrolyte comprising:
        a lithium salt selected from the group consisting of:
            lithium bis(fluorosulfonyl)imide (LiFSI),
            lithium bis(trifluoromethanesulfonyl)imide (LiTFSI), and lithium dicyanamide (LiDCA); and
an ionic liquid comprising:
an organic cation selected from the group consisting of: 1-methyl-1-propylpyrrolidinium; N-methyl-N,N-diethyl-N-propylammonium; N,N-diethyl-N-methyl-N-(2-methoxyethyl)-ammonium; 1,1-methylpropylpiperidinium; N-methyl-N-(2-methoxyethyl)-pyrrolidinium; trimethylisopropylphosphonium; methyltriethylphosphonium; methyltributylphosphonium; N,N-dimethyl-N-(2-methoxyethyl)-N-ethyl-ammonium; 1-methyl-1-butylpyrrolidinium; N-methyl-N'-ethylimidazolium); N,N,N-trimethyl-N-propylammonium; and mixtures thereof; and
an anion selected from the group consisting of FSI, TFSI, and DCA; and
assembling a wet lithium-ion cell comprising:
the protected anode; and
a wet electrolyte in contact with the protected anode, the wet electrolyte comprising at least 10,000 ppm water.

2. The method as recited in claim 1, wherein the at least one lithium-ion insertion electrode comprises at least one of an intercalation anode, a conversion anode, and an alloy anode.

3. The method as recited in claim 1, wherein the at least one lithium-ion insertion electrode comprises lithium titanate.

4. The method as recited in claim 1, wherein the lithium salt is present at a molar ratio, relative to ionic liquid of: at least 1:1.

5. The method as recited in claim 1, wherein the lithium salt is present at its saturation point in the ionic liquid.

6. The method as recited in claim 1, further comprising, prior to assembling the wet lithium-ion cell, washing the protected anode with a solvent in which the SEI formation electrolyte is soluble.

7. The method as recited in claim 1, wherein the SEI formation electrolyte has a water content of less than 50 ppm.

8. The method as recited in claim 1, wherein the wet electrolyte comprises water present at a concentration of at least 20,000 ppm.

9. The method as recited in claim 1, wherein the cyclic lithiation/delithiation is performed at a lithiation voltage less than about 0.1 V.

10. The method as recited in claim 1, wherein a surface of the protected insertion anode comprises at least 5% fluorine.

11. The method as recited in claim 1, wherein a surface of the protected insertion anode comprises at least 0.5% sulfur.

12. The method as recited in claim 1, wherein the cation comprises Pyr13.

13. The method as recited in claim 1, wherein the cation comprises N1223.

14. The method as recited in claim 1, wherein the cation comprises DEME.

15. The method as recited in claim 1, wherein the cation comprises Pip13.

16. The method as recited in claim 1, wherein the cation comprises $P111_i4$.

17. The method as recited in claim 1, wherein the cation comprises $Pyr12_O1$.

18. The method as recited in claim 1, wherein the cation comprises P1222.

19. The method as recited in claim 1, wherein the cation comprises P1444.

20. A method for preparing a lithium-ion cell having a protected insertion anode with a pre-formed solid electrolyte interphase (SEI), the method comprising:
forming an SEI on at least one lithium-ion insertion electrode by performing cyclic lithiation/delithiation on the lithium-ion insertion electrode in a first cell having an SEI formation electrolyte to produce the protected insertion anode, the SEI formation electrolyte having a water concentration less than about 50 ppm, and comprising:
lithium bis(fluorosulfonyl)imide (LiFSI); and
an ionic liquid comprising:
an organic cation selected from the group consisting of: 1-methyl-1-propylpyrrolidinium; N-methyl-N,N-diethyl-N-propylammonium; N,N-diethyl-N-methyl-N-(2-methoxyethyl)-ammonium; 1,1-methylpropylpiperidinium; N-methyl-N-(2-methoxyethyl)-pyrrolidinium; trimethylisopropylphosphonium; methyltriethylphosphonium; methyltributylphosphonium; N,N-dimethyl-N-(2-methoxyethyl)-N-ethyl-ammonium; 1-methyl-1-butylpyrrolidinium; N-methyl-N'-ethylimidazolium); N,N,N-trimethyl-N-propylammonium; and mixtures thereof; and
bis(fluorosulfonyl)imide anion; and
assembling a wet Li-ion voltaic cell comprising:
the protected anode; and
a wet electrolyte in contact with the protected anode, the wet electrolyte comprising at least 10,000 ppm water.

* * * * *